No. 806,038. PATENTED NOV. 28, 1905.
C. F. WILLIAMS.
CUTTING DEVICE.
APPLICATION FILED JUNE 23, 1905.

Witnesses
Geo Ackman Jr.
C. C. Hines

Inventor
Charles F. Williams,
By Victor J. Evans
Attorney

UNITED STATES PATENT OFFICE.

CHARLES F. WILLIAMS, OF MADISON, INDIANA.

CUTTING DEVICE.

No. 806,038.  Specification of Letters Patent.  Patented Nov. 28, 1905.

Application filed June 23, 1905. Serial No. 266,626.

*To all whom it may concern:*

Be it known that I, CHARLES F. WILLIAMS, a citizen of the United States, residing at Madison, in the county of Jefferson and State of Indiana, have invented new and useful Improvements in Cutting Devices, of which the following is a specification.

This invention relates to a cutting device which I preferably term "rotating" shears or scissors, adapted to be used for cutting paper, cloth, leather, sheet metal, and various kinds of fabrics and materials, the object being to provide a cutting device embodying a rotary cutting wheel or disk and operating mechanism therefor whereby materials of the described character may be rapidly and cleanly cut.

The preferred embodiment of the invention is illustrated in the accompanying drawings, in which—

Figure 1:
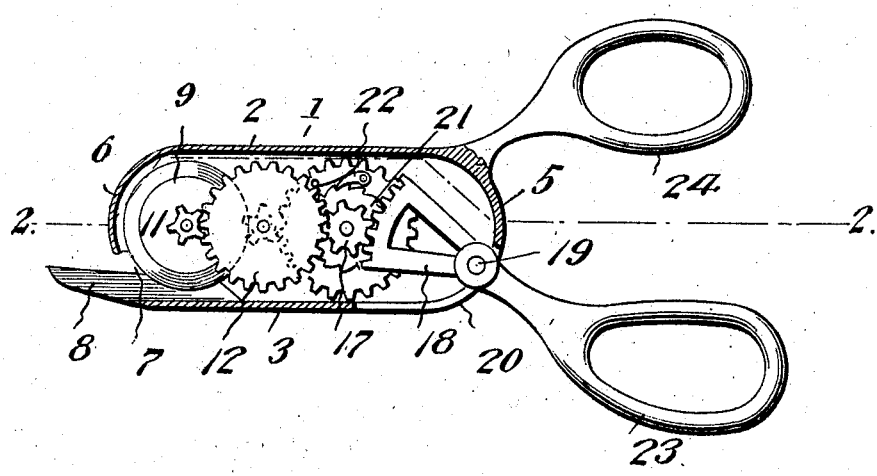
Figure 2:
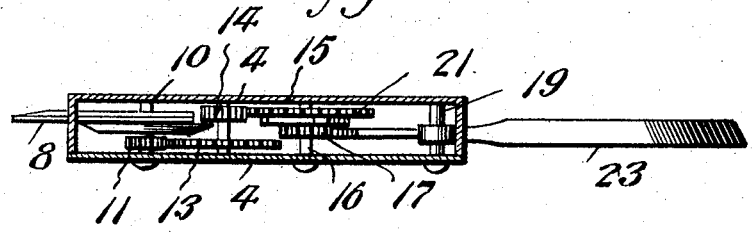

Figure 1 is a vertical longitudinal section of the improved cutting device, and Fig. 2 is a horizontal section taken on the line 2 2 of Fig. 1.

Referring now more particularly to the drawings, the numeral 1 represents a casing, preferably of oblong form and composed of flat top, bottom, and side walls 2, 3, and 4, a curved rear wall 5, and a short curved depending front wall 6, terminating a sufficient distance above the top wall 3 to form a slot or passage for the entrance of the edge of the material to be cut, the bottom wall 3 being provided with a vertically-arranged and forwardly-projecting fixed cutting-blade 8.

Arranged within the front portion of the casing to coöperate with the stationary blade 8 is a rotary cutting wheel or disk 9, mounted on a transverse shaft 10, on which is also mounted a pinion 11. The pinion meshes with a power-transmitting gear-wheel 12, mounted on a transverse shaft 13, on which is also mounted a pinion 14. The pinion 14 is in mesh with a driving-gear 15, loosely mounted on a transverse shaft 16, fixed to which is a driving-pinion 17, adapted to receive motion from a toothed sector 18, fulcrumed on a suitable pivot 19, the bottom of the casing being provided at rear with a slot 20 to permit of the free movement of the sector the desired distance for imparting motion to the pinion 17. Fixed to the shaft 16 between the pinion 17 and the driving gear-wheel 15 is a ratchet-wheel 21, the teeth of which are engaged by a spring-actuated pawl or dog 22, carried by the gear 15, thus forming a clutch connection between the driving-shaft 16 and the wheel 15 to permit the pinion 17 to turn independently of said wheel 15 in a forward direction and to operatively connect the pinion and driving-wheel when the pinion is turned rearwardly. The sector 18 is adapted to be operated by a looped handle or lever 23, adapted to be engaged by one or more fingers of the hand, while the casing is provided above said lever with a stationary handle 24, looped to receive the thumb.

In operation the device is held in the hand in an obvious manner and the edge of the material to be cut inserted into the casing through the entrance-slot 7 and the handle or lever 23 oscillated toward and from the handle 24. On its downward or outward movement the handle 23 turns the pinion 17 forwardly and the teeth of the clutch-disk 21 slide over the pawl 22, thus allowing the handle 23 to be moved outwardly for operation without imparting motion to the cutting-disk 9. When the handle 23 is drawn toward the handle 24, the pinion 17 will be rotated rearwardly and the shoulders of the teeth of the ratchet-disk 21 will engage the pawl 22 and rigidly connect the driving-wheel 15 therewith, whereupon said wheel will be operated to transfer motion through the intervening gearing to the cutting-disk 9. The disk 9 will then operate in conjunction with the stationary cutting-blade 8 to cut the material, and by successive operations of the handle 23 this may be performed in a rapid manner and the edges of the material will be neatly and cleanly cut.

Having thus described my invention, what I claim as new, and desire to secure by Letters Patent, is—

1. A cutting device provided with a stationary cutting member, a coacting rotary cutting member, stationary and movable handles, and means actuated by said movable handle for operating the rotary cutting member.

2. A cutting device provided with a stationary cutting-blade, a coacting rotary cutting-disk, stationary and movable handles, and means actuated by said movable handle for rotating the disk.

3. A cutting device provided with coacting stationary and rotating cutting elements, an operating member, and intervening gearing for operating the rotary cutting element, said gearing being adapted when the operating member is moved in one direction to rotate the disk and to permit the operating member to move in the opposite direction without actuating the disk.

4. A cutting device provided with stationary and rotary cutting members, an operating device, and connections between said operating device and rotary cutting member, said connections being adapted to permit the operating member to have independent movement in one direction and to actuate the rotary cutting member when moved in the opposite direction.

5. A cutting device comprising a frame or casing provided with a stationary cutting element, a rotary cutting element coacting therewith, an oscillatory operating device carrying a toothed sector, and gearing between said sector and rotary cutting element, said gearing including a clutch member to permit the operating device to have movement in one direction without operating said rotary cutting element.

6. A cutting device provided with a stationary cutting member, a coacting rotary cutting member, a manually-operable lever, and means actuated by said lever for imparting motion to the rotary cutting member.

In testimony whereof I affix my signature in presence of two witnesses.

CHARLES F. WILLIAMS.

Witnesses:
 THOMAS LAWSON,
 ALICE W. WILLIAMS.